UNITED STATES PATENT OFFICE.

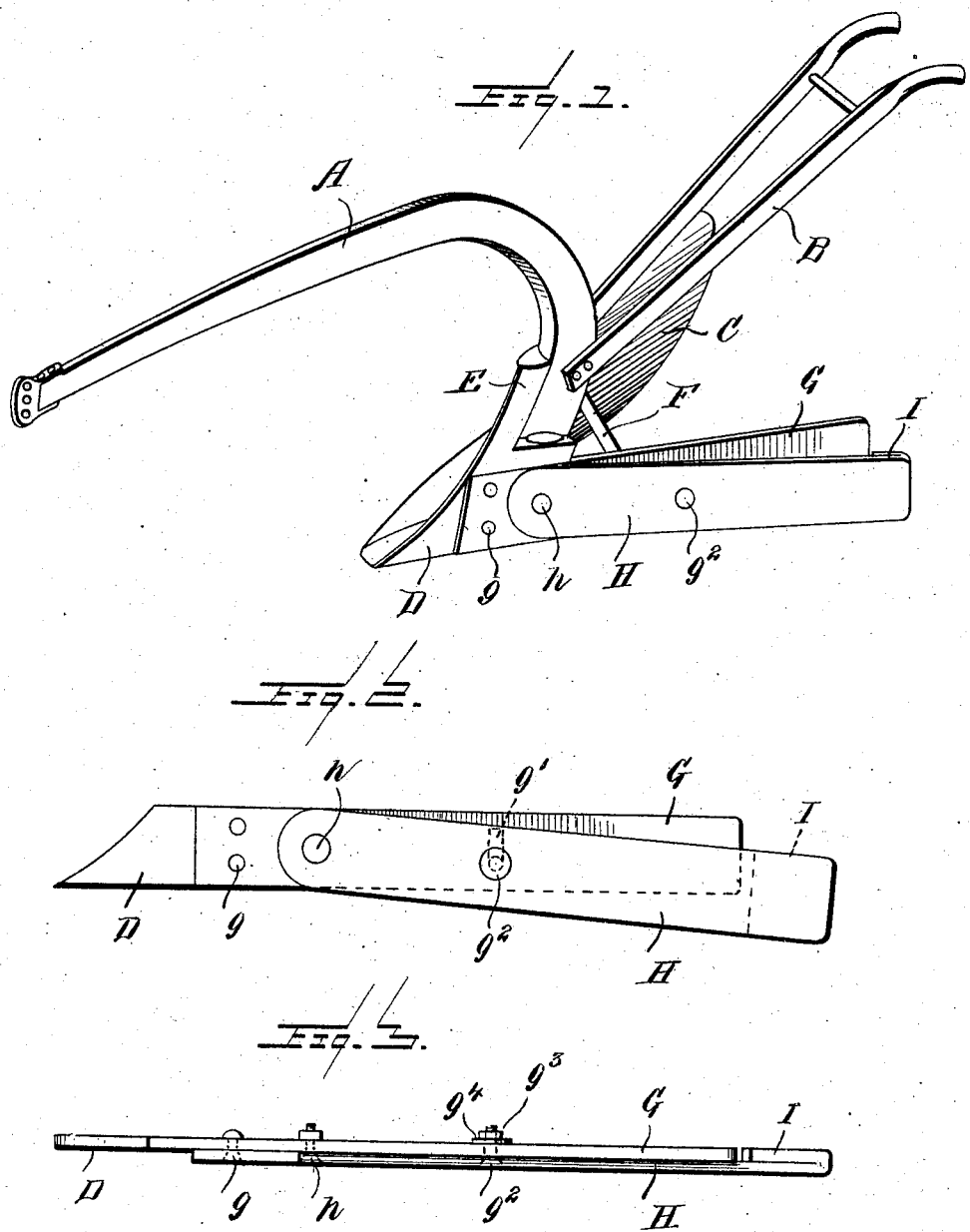

GEORGE A. STAFFORD AND EDWARD HENRY, OF BELCHERVILLE, TEXAS.

PLOW.

No. 851,260.           Specification of Letters Patent.           Patented April 23, 1907.

Application filed November 27, 1906. Serial No. 345,305.

*To all whom it may concern:*

Be it known that we, GEORGE A. STAFFORD and EDWARD HENRY, citizens of the United States, residing at Belcherville, in the county of Montague and State of Texas, have invented certain new and useful Improvements in Plows, of which the following is a specification.

Our invention relates to improvements in plows, and the object of the invention is to simplify, improve and cheapen the cost of the construction of this class of plows over the existing prior state of the art.

With these ends in view, the invention consists in the novel construction and combination of parts as will be hereinafter more in detail described and specifically claimed.

We have fully and clearly illustrated our invention in the accompanying drawings, in which:

Figure 1 is a perspective view of our improved plow in operative assemblage of parts. Fig. 2 is a side elevation, showing an adjustable landside and its degree of adjustment, and Fig. 3 is a plan or edge view of the same.

Similar letters of reference denote corresponding parts in the several figures.

Referring to the drawings by letter, A designates a plow beam provided with handles B in the rear thereof and secured at their lower ends to the lower part or shank of the beam. C designates a mould-board arranged on the right hand side of and also secured to the lower portion or shank of the beam A in any suitable manner. D designates a plow-share secured also to the lower portion of the shank of the beam. These features just described, being of the usual construction, form no part of our invention.

F designates a brace which is interposed between the mould-board and an inside land or furrow bar, and also pivotally secured to the latter is an outer adjustable land-side, the two latter elements of which will be hereinafter more fully described.

G designates an inside land or furrow bar having its forward end rigidly secured to the plow-share D by means of bolts $g$ and extending rearwardly therefrom and midway of its length is formed therein a vertical slot $g'$ in which takes a bolt or pivot $g^2$ secured to an adjustable land-side H having a nut $g^3$ and washer $g^4$ on the bolt and on the outer side of the landside G midway of its length and in alignment with the vertical slot $g'$ formed in the inside land or furrow bar. The forward end of the land-side is pivotally and adjustably secured to the inside land or furrow bar near its forward end by means of a pivot $h$, and the rear end of said land-side is provided with a heel I which, when the land-side is in its normal position, is in alignment with the inside land or furrow bar G, as clearly shown in Fig. 3 of the drawings.

The land-side by its adjustment serves the purpose of throwing and keeping point of the plow-share down more or less, according to the adjustment given, and thus obviate the difficulty of its riding out of the furrow. This adjustment is shown in a degree in Fig. 2 of the drawings. By lowering the heel of the land-side it will adjust the plow to the ground and will protect the frog of the plow from wearing out.

By such construction as herein shown of our improved turning plow it will be obvious that we are enabled to provide properly for the adjustment at all points of the land-side relatively with the inside land or furrow bar of the plow. By means of the pivot at the forward end of the land-side and the pivot or bolt having the nut and washer thereon midway of said land-side engaging the vertical slot in the inside land or furrow bar adjustment is made to any depth of furrow to suit the operator.

Having thus described our invention, what we claim and desire to secure by Letters Patent is:

A pivoted landside having a bolt which is adjustably located in the slot $g'$ of the furrow-bar, the rear end of the landside being doubled upon itself in order to reinforce the point of greatest wear of said landside substantially as herein shown and described.

In testimony whereof we affix our signatures, in presence of two witnesses.

GEORGE A. STAFFORD.
EDWARD HENRY.

Witnesses:
   GEO. A. HENRY,
   W. A. HENRY.